United States Patent
Li et al.

(10) Patent No.: US 8,089,236 B2
(45) Date of Patent: Jan. 3, 2012

(54) SYSTEM AND METHOD FOR ADJUSTING PULSE WIDTH MODULATION SIGNALS ACCORDING TO COMPONENT TEMPERATURES IN A COMPUTER

(75) Inventors: Jiao Li, Shenzhen (CN); Zhi-Feng Gao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 534 days.

(21) Appl. No.: 12/344,225

(22) Filed: Dec. 25, 2008

(65) Prior Publication Data

US 2009/0261768 A1 Oct. 22, 2009

(30) Foreign Application Priority Data

Apr. 16, 2008 (CN) .......................... 2008 1 0301156

(51) Int. Cl.
*H02P 1/04* (2006.01)
(52) U.S. Cl. ......... 318/471; 318/599; 318/472; 318/461
(58) Field of Classification Search .................. 318/471, 318/472, 473, 461, 599, 811
See application file for complete search history.

(56) References Cited

U.S. PATENT DOCUMENTS

| | | | | |
|---|---|---|---|---|
| 6,040,668 | A * | 3/2000 | Huynh et al. | 318/471 |
| 6,396,231 | B1 * | 5/2002 | Horng et al. | 318/471 |
| 6,810,202 | B2 * | 10/2004 | Hsu et al. | 388/800 |
| 7,199,542 | B1 * | 4/2007 | Chen | 318/473 |
| 7,375,486 | B2 * | 5/2008 | Ku et al. | 318/599 |
| 7,609,018 | B2 * | 10/2009 | Lin et al. | 318/471 |

FOREIGN PATENT DOCUMENTS

TW 200619640 A 12/2004

* cited by examiner

*Primary Examiner* — Walter Benson
*Assistant Examiner* — Thai Dinh
(74) *Attorney, Agent, or Firm* — Altis Law Group, Inc.

(57) ABSTRACT

A computer-based method for adjusting pulse width modulation (PWM) signals according to temperatures of one or more computer components includes setting a frequency formula for a fan in a computer. The method further includes reading current temperatures of one or more components in the computer from a temperature measuring device. Furthermore, the method includes computing a frequency according to the frequency formula and the current temperatures, and sending the computed frequency to a PWM signal manager for generating an adjustment PWM signal to control the rotational speed of the fan in the computer.

15 Claims, 2 Drawing Sheets

SYSTEM AND METHOD FOR ADJUSTING PULSE WIDTH MODULATION SIGNALS ACCORDING TO COMPONENT TEMPERATURES IN A COMPUTER

BACKGROUND OF THE INVENTION

1. Field of the Invention

Embodiments of the present disclosure relate to pulse width modulation (PWM) signals management systems and methods, and more particularly to a system and method for adjusting PWM signals according to component temperatures in a computer to control the rotational speed of fan in the computer.

2. Description of Related Art

Pulse width modulation (PWM) is a powerful technique for controlling analog circuits. PWM is employed in a wide variety of applications, ranging from measurement and communications to power control and conversion, such as controlling the rotational speed of a central processing unit (CPU) fan in a computer. However, the frequency of the PWM signals for controlling the fan is often fixed, and may not be adjusted according to the temperatures of the components (e.g., the CPU) in the computer.

Therefore, what is needed is a system and method overcoming the aforementioned problem.

DETAILED DESCRIPTION OF CERTAIN INVENTIVE EMBODIMENTS

All of the processes described below may be embodied in, and fully automated via, function code modules executed by one or more general purpose computers or CPUs. The code modules may be stored in any type of computer-readable medium or other computer storage device. Some or all of the methods may alternatively be embodied in specialized computer hardware. The function code modules may be stored in any type of computer-readable medium or other computer storage device.

Figure 1:
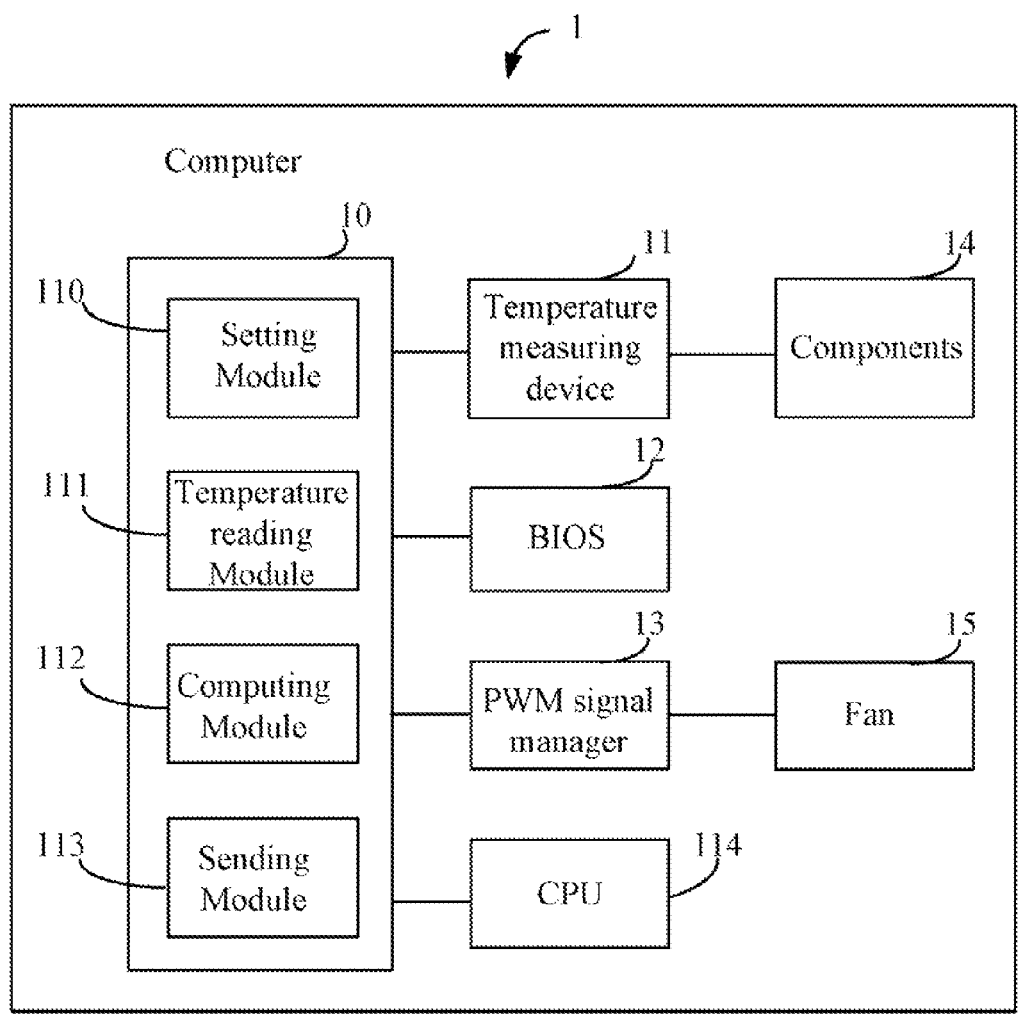
FIG. 1 is a block diagram of one embodiment of a system for adjusting PWM signals according to component temperatures in a computer.

FIG. 1 is a block diagram of one embodiment of a system 10 for adjusting PWM signals according to temperatures of one or more components 14 in a computer 1, so as to control the rotational speed of a fan 15 in the computer 1. In the illustrated embodiment, the computer 1 includes a temperature measuring device 11, a basic input and output system (BIOS) 12, the components 14, and the fan 15. The temperature measuring device 11 is connected to the components 14 and is configured to measure a current temperature of each of the components 14. In one embodiment, the temperature measuring device 11 is a thermocouple. The components 14 may include, but are not limited to, a central processing unit (CPU), a graphic processing unit (GPU), a chipset, and a computer chassis. The PWM signal manager 13 generates PWM signals for controlling the rotational speed of the fan 15 according to the temperatures of the components 14. In one embodiment, the fan 15 may include, but is not limited to, a CPU fan, a GPU fan, or a system fan. The system fan is a fan 15 that will cool the entire system of the computer 1. In this embodiment, the system fan is installed on the computer chassis of the computer 1. Depending on the embodiment, the computer 1 may be a personal computer (PC), a network server, or any other appropriate data-processing equipment.

The system 10 comprises a plurality of function modules for computing frequencies of PWM signals according to temperatures of the components 14, and generating an adjustment PWM signal according to the computed frequency for adjusting the rotational speed of the fan 15. In the illustrated embodiment, the system 10 includes a setting module 110, a temperature reading module 111, a computing module 112, and a sending module 113. The modules 110, 111, 112, 113 may be used to execute one or more operations for the computer 1. Additionally, the computer 1 may comprise one or more specialized or general purpose processors, such as a CPU 114, for executing the modules 110, 111, 112, 113.

The setting module 110 is configured for setting formula for computing frequency of PWM signals of the temperature of the components 14 (hereinafter, "the PWM signal frequency formula) in the BIOS 12 of the computer 1 for the fan 15. In one embodiment, the PWM signal frequency formula for the fan 15 is $$P = \sum_{i=1}^{n} A_i (T_i - T_{i0}) k_i + b,$$

wherein "n" is the number of components 14, "$T_i$" is the current temperature of the components 14, "$A_i$," "b," and "$T_{i0}$" are constants according to a type of the fan 15 that the formula is applied for. For example, in this embodiment, for computing a frequency of PWM signals of the CPU fan 15, "$A_1$" is equal to "3," "$A_2$" is equal to "4," "$T_{10}$" is equal to "36," "$T_{20}$" is equal to "43," and "b" is equal to "30." Accordingly, P is: P=$3k_1$*($T_1$−36)+$4k_2$*($T_2$−43)+30. In another example, for computing a frequency of PWM signals of the system fan 15, "$A_1$" is equal to "3," "$A_2$" is equal to "2," "$T_{10}$" is equal to "37," "$T_{20}$" is equal to "46," and "b" is equal to "32." In addition, if the value "$T_i$" is larger than the value of "$T_{i0}$," the value of "$k_i$"equal to "1," and if the value "$T_i$" is less than or equal to the value of "$T_{i0}$," the "$k_i$" is equal to "0." In one embodiment, if the components 14 are the CPU and the computer chassis, "n" is equal to "2," "$T_1$" is the current temperature of the CPU, and "$T_2$" is the current temperature of the computer chassis. It may be understood that values for each of the variables for the formula of P may be varied according to the type of the component 14.

The temperature reading module 111 is configured for reading current temperatures of the components 14 from the temperature measuring device 11. In one embodiment, the temperature measuring device 11 measures the current temperature "$T_1$" of the CPU and the current temperature "$T_2$" of the computer chassis, then the temperature reading module 11 reads the temperature "$T_1$" of the CPU and the temperature "$T_2$" of the computer chassis from the temperature measuring device 11.

The computing module 112 is configured for computing a frequency according to the frequency computation formula and the current temperatures. In one embodiment, for example, if the current temperature "$T_1$" of the CPU is equal to "37," and the current temperature "$T_2$" of the computer chassis is equal to "45," the computing module 112 computes the frequency of PWM signals for the CPU fan 15 as follows: P=3*1*(37−36)+4*1*(45−43)+30. As a result, the computed frequency of PWM signals for the CPU fan 15 equals 41 Megahertz (MHz).

The sending module 113 is configured for sending the computed frequency to a PWM signal manager 13 to generate an adjustment PWM signal according to the computed frequency. In one embodiment, for example, if the computed frequency is "41," the PWM signal manager 13 generates a PWM signal having a frequency of 41 MHz. The adjustment PWM signal is used for adjusting the rotational speed of the CPU fan 15.

Figure 2:
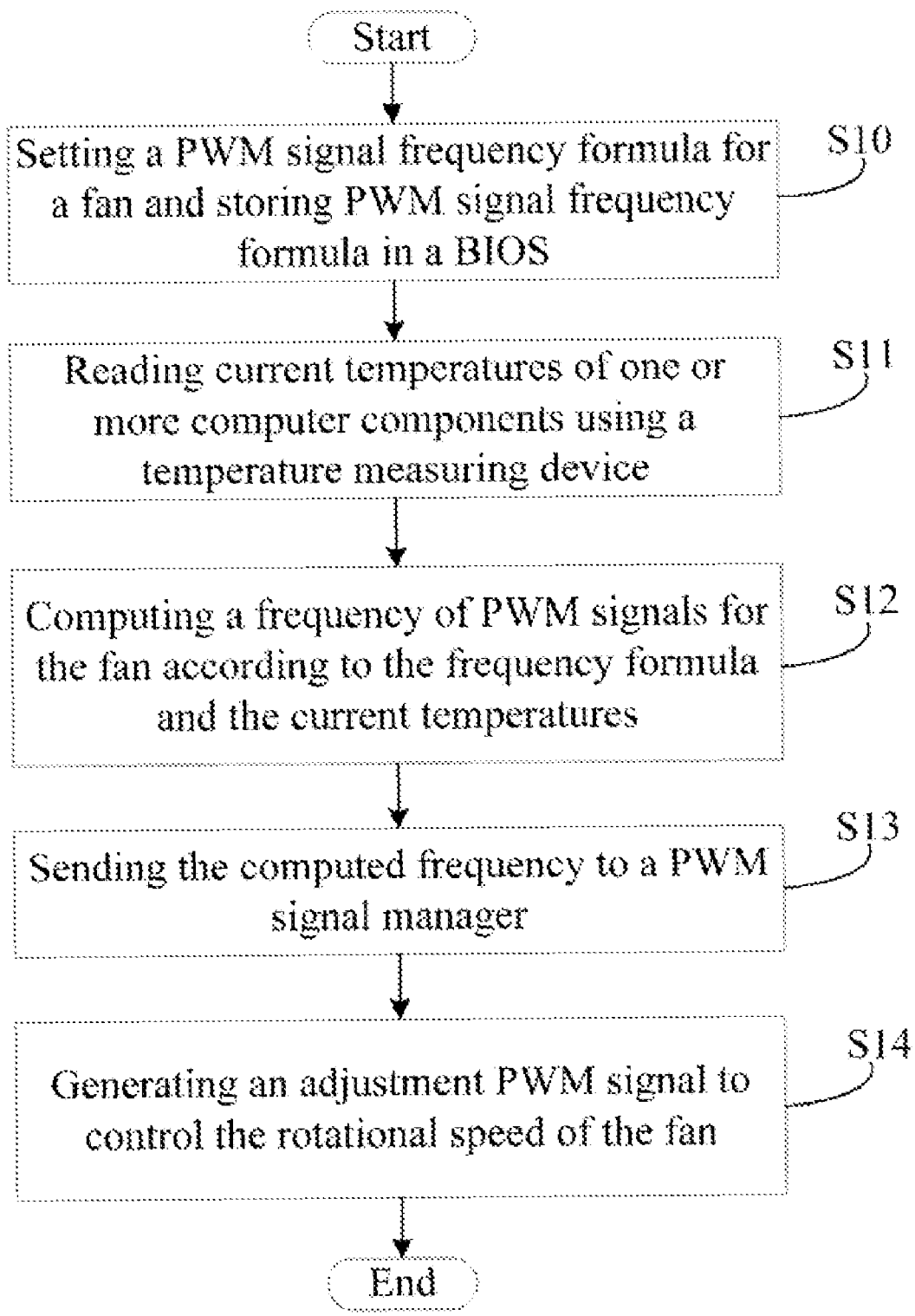
FIG. 2 is a flowchart of one embodiment of a method for adjusting PWM signals according to component temperatures in a computer.

FIG. 2 is a flowchart of one embodiment of a method for adjusting PWM signals according to component 14 temperatures in the computer 1, so as to control the rotational speed of the fan 15. Depending on the embodiment, additional blocks may be added, while others deleted, and the blocks may also be executed in a different order than described.

In block S10, the setting module 110 sets a PWM signal frequency formula in the BIOS 12 of the computer 1 for the fan 15. As mentioned above, the formula for computing an computed frequency of PWM signals for the CPU fan 15 is $P=3k_1*(T_1-36)+4k_2*(T_2-43)+30$.

In block S11, the temperature reading module 111 reads current temperatures of the components 14 in the computer 1 from the temperature measuring device 11. As mentioned above, the temperature measuring device 11 measures the current temperature "$T_1$" of the CPU and the current temperature "$T_2$" of the computer chassis, then the temperature reading module 111 reads the current temperature "$T_1$" of the CPU and the current temperature "$T_2$" of the computer chassis from the temperature measuring device 11.

In block S12, the computing module 112 computes a frequency of PWM signals for the fan 15 according to the PWM signal frequency formula and the current temperatures of the components 14. As mentioned above, if the current temperature "$T_1$" of the CPU is equal to "37," and the current temperature "$T_2$" of the computer chassis is equal to "45," the computing module 112 computes the frequency of PWM signals for the CPU fan 15 as follows: $P=3*1*(37-36)+4*1*(45-43)+30$. Thus, the computed frequency for the CPU fan 15 equals 41 MHz.

In block S13, the sending module 113 sends the computed frequency to a PWM signal manager 13.

In block S14, the PWM signal manager 13 generates an adjustment PWM signal according to computed frequency, and adjusts the rotational speed of the CPU fan 15 according to the adjustment PWM signal. As mentioned above, for example, if the computed frequency is "41," the PWM signal manager 13 generates a PWM signal having a frequency of 41 MHz. The adjustment PWM signal is used for adjusting the rotational speed of the CPU fan 15.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for adjusting pulse width modulation (PWM) signals according to temperatures of one or more computer components in a computer, the system comprising:
   a setting module configured for setting a PWM signal frequency formula for a fan in the computer, and storing the PWM signal frequency formula in a basic input and output system (BIOS) of the computer;
   a temperature reading module configured for reading current temperatures of the one or more computer components using a temperature measuring device;
   a computing module configured for computing a frequency of PWM signals for the fan according to the frequency formula and the current temperatures;
   a sending module configured for sending the computed frequency to a PWM signal manager to generate an adjustment PWM signal for the fan to control the rotational speed of the fan in the computer according to the adjustment PWM signal; and
   at least one central processing unit (CPU) that executes the setting module, the temperature reading module, the computing module, and the sending module.

2. The system of claim 1, wherein the temperature measuring device is a thermocouple.

3. The system of claim 1, wherein the one or more computer components comprise a component selected from the group consisting of the CPU, a graphic processing unit (GPU), a chipset, and a computer chassis.

4. The system of claim 1, wherein the fan comprises a type selected from the group consisting of a CPU fan, a GPU fan, and a system fan of the computer.

5. The system of claim 1, wherein the PWM signal frequency formula is computed as follows:

$$P = \sum_{i=1}^{n} A_i(T_i - T_{i0})k_i + b,$$

wherein "n" is the number of components, "$T_i$" is the current temperature of the components, "$A_i$," "b," and "$T_{i0}$" are constants according to a type of a fan for which the frequency is computed, wherein if the value "$T_i$" is larger than the value of "$T_{i0}$," the value of "$k_i$" is equal to "1," and wherein if the value "$T_i$" is less than or equal to the value of "$T_{i0}$," the value of "$k_i$" is equal to "0."

6. A computer-based method for adjusting pulse width modulation (PWM) signals according to temperatures of one or more computer components in a computer, the method comprising:
   setting a PWM signal frequency formula for a fan in the computer, and storing the PWM signal frequency formula in a basic input and output system (BIOS) of the computer;
   reading current temperatures of the one or more computer components using a temperature measuring device;
   computing a frequency of PWM signals for the fan according to the frequency formula and the current temperatures;
   sending the computed frequency to a PWM signal manager; and
   generating an adjustment PWM signal using the PWM signal manager according to the computed frequency and adjusting the rotational speed of the fan in the computer according to the adjustment PWM signal.

7. The method of claim 6, wherein the temperature measuring device is a thermocouple.

8. The method of claim 6, wherein the one or more computer components comprise a component selected from the group consisting of a central processing unit, a graphic processing unit (GPU), a chipset, and a computer chassis.

9. The method of claim 6, wherein the fan comprises a type selected from the group consisting of a CPU fan, a GPU fan, and a system fan of the computer.

10. The method of claim 6, wherein the PWM signal frequency formula is computed as follows:

$$P = \sum_{i=1}^{n} A_i(T_i - T_{i0})k_i + b,$$

wherein "n" is the number of components, "$T_i$" is the current temperature of the components, "$A_i$," "b," and "$T_{i0}$" are constants according to a type of a fan for which the frequency is computed, wherein if the value "$T_i$" is larger than the value of "$T_{i0}$," the value of "$k_i$" is equal to "1," and wherein if the value "$T_i$" is less than or equal to the value of "$T_{i0}$," the value of "$k_i$" is equal to "0."

11. A computer-readable medium having stored thereon instructions that, when executed by a computing device, causing the computing device to perform a method for adjusting pulse width modulation (PWM) signals according to component temperatures in a computer, the method comprising:

setting a PWM signal frequency formula for a fan in the computer, and storing the PWM signal frequency formula in a basic input and output system (BIOS) of the computer;

reading current temperatures of the one or more computer components using a temperature measuring device;

computing a frequency of PWM signals for the fan according to the frequency formula and the current temperatures;

sending the computed frequency to a PWM signal manager; and generating an adjustment PWM signal using the PWM signal manager according to the computed frequency and adjusting the rotational speed of the fan in the computer according to the adjustment PWM signal.

12. The medium of claim 11, wherein the temperature measuring device is a thermocouple.

13. The medium of claim 11, wherein the one or more computer components comprise a component selected from the group consisting of a central processing unit, a graphic processing unit (GPU), a chipset, and a computer chassis.

14. The medium of claim 11, wherein the fan comprises a type selected from the group consisting of a CPU fan, a GPU fan, and a system fan of the computer.

15. The medium of claim 11, wherein the PWM signal frequency formula is computed as follows:

$$P = \sum_{i=1}^{n} A_i(T_i - T_{i0})k_i + b,$$

wherein "n" is the number of components, "$T_i$" is the current temperature of the components, "$A_i$," "b," and "$T_{i0}$" are constants according to a type of a fan for which the frequency is computed, wherein if the value "$T_i$" is larger than the value of "$T_{i0}$," the value of "$k_i$" is equal to "1," and wherein if the value "$T_i$" is less than or equal to the value of "$T_{i0}$," the value of "$k_i$" is equal to "0."

* * * * *